Nov. 2, 1965    W. C. HALCOMB ETAL    3,215,552
MENDING MATERIAL FOR FABRICS
Filed Oct. 12, 1960

INVENTORS.
Walter C. Halcomb
John F. Morris
BY
ATTORNEY.

United States Patent Office 3,215,552
Patented Nov. 2, 1965

3,215,552
MENDING MATERIAL FOR FABRICS
Walter C. Halcomb, Harrisonville, Mo., and John F. Morris, Merriam, Kans., assignors to Jiffy Enterprises, Inc., a corporation of Missouri
Filed Oct. 12, 1960, Ser. No. 62,246
3 Claims. (Cl. 117—4)

This invention relates to mending sheets or repair patches for clothing or other fabric articles and refers more particularly to a product of this type which is heat sealable to the article being repaired through the use of the ordinary household iron.

We are aware that heat sealable patching or repair materials have been and are presently being employed on a wide scale. Usually such materials are formed with a fabric backing which is coated with a heat reactive film and which, upon application of heat and pressure, is bonded to the surface of the article being mended. However, in all materials of this type with which we are familiar serious shortcomings exist.

In most cases the adhesive film contains additives such as plasticizers which are soluble in dry cleaning solvents or washing detergents. As a result, normal cleaning or laundry treatment of articles mended with such patches results in progressive stiffening of the patch with an increase in brittleness of the adhesive. Not only does this produce discomfort on the part of the wearer (if the mended article is a garment or bedding), but also there is a tendency for the patch to tear loose from the article as it is subjected to flexural forces occurring during agitation of laundry or dry cleaning machines or during use.

Some of the presently known heat sealable mending materials of which we have knowledge also have a tendency to bleed through the fabric to which they are attached, resulting in unsightly discoloration or matting of the exposed surface. Others are extremely difficult to apply correctly because of the inability to obtain uniform heat distribution through the entire film area during application.

One of the principal objectives of the present invention is to provide a heat sealable fabric and adhesive laminate capable of being securely bonded to all types of fabrics, garments and laundry goods in general, and which will remain soft, flexible and securely attached to the base material through repeated washings or dry cleanings. It is one of the important features of our invention that the mending sheets or patches, according to the invention, retain a secure bond to the base material in the presence of known dry cleaning solvents and washing detergents or soaps and suffer no measurable deterioration through contact therewith.

Still another object of the invention is to provide a heat sealable patching or repair sheet which retains its flexibility and softness over a long period of time despite exposure to adverse climatic conditions such as heat, cold and rapid temperature changes.

A further object of the present invention is to provide a heat sealable patching or repair sheet which is bondable to a wide variety of fabrics, both of natural and synthetic fibers, and which remain securely bonded thereto despite subsequent rough treatment and usage.

Still another object of the invention is to provide a heat sealable mending or repair strip or patch which, due to its manner of construction, is capable of being more quickly applied to the damaged fabric or garment than those presently known, and which dries more quickly after laundry or dry cleaning.

Other and further objects of the invention, together with the features of novelty appurtenant thereto will appear in the course of the following description.

In the accompanying drawing which forms a part of the instant specification and is to be read in conjunction therewith, and in which like reference numerals indicate like parts in the various views.

Figure 1:
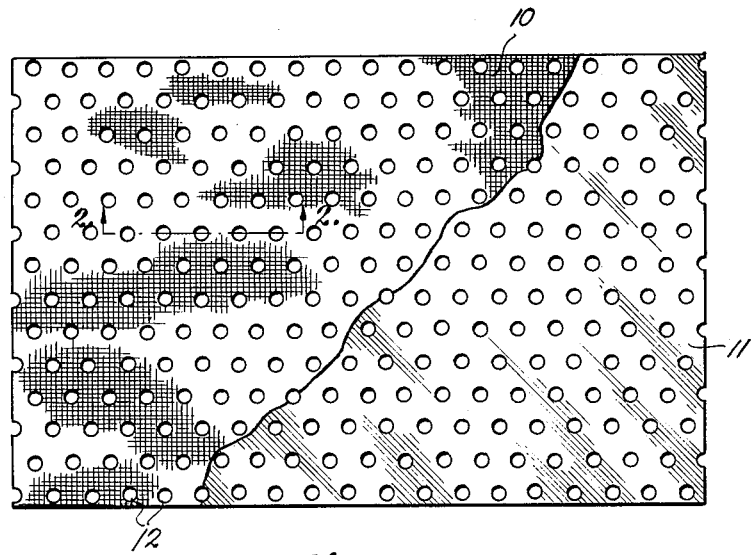
FIG. 1 is a plan view looking toward the backing side of a typical mending sheet embodying the invention.
Figure 2:
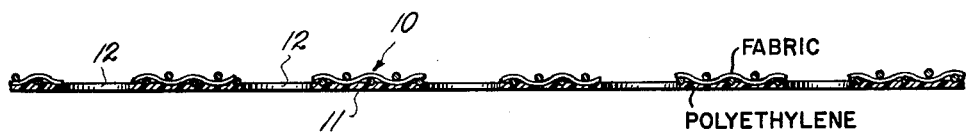
FIG. 2 is a cross sectional view on a greatly enlarged scale of the sheet of FIG. 1.

Referring to the drawing, the mending sheet according to the present invention includes a fabric backing 10 to which is applied on one face a thin film 11 of polyethylene. The film is applied to the fabric by any suitable method, preferably through spreading it thereon while in liquid state through a "hot melt" process. For best results the film should be coated on in a uniform thickness, say 2 to 5 mils.

Once the film has been applied and set the sheet is perforated with a pattern of relatively closed spaced perforations 12. We have found that optimum flexibility and heat transfer, as well as ability for quick drying, is achieved through utilizing perforations $\frac{1}{32}$ inch in diameter arranged in parallel rows with the perforations of adjoining rows staggered in location as shown. The rows are spaced from one another approximately $\frac{1}{16}$ inch on centers with the perforations in each row spaced $\frac{1}{8}$ inch on centers. However, appreciably better results are obtained as compared with unperforated material with any pattern of perforations, and we do not intend the invention to be limited to the specific embodiment herein described.

The backing material 10 may be of any flexible fabric as long as it has the capability of accepting and supporting the desired film of polyethylene. In other words, any backing material will serve, provided it has sufficient strength for the use contemplated, is capable of holding the film thereon, and is yet not so porous as to permit undue penetration of the film material when softened or in liquid state therethrough. Preferably for most uses, the backing will be a tightly woven cotton cloth.

The polyethylene of which the film 11 is composed must meet certain specifications in order to satisfactorily produce the results desired. The density must be low enough to permit penetration of the fabric to which it is bonded, and yet not too low as this will result in excessive penetration or "bleed." The melt index, which as is known is a measure of the average molecular weight distribution, must also fall within certain limits in order to provide the necessary flowability under heat applied by the household iron. The polyethylene utilized for the film should therefore be selected from those which fall in a density range of from 0.913 to 0.925 gram per cubic centimeter and a melt index range of 4 to 25. As a particular example of polyethylene coming within these ranges in which we have employed with extremely successful results, reference is made to "Poly-Eth" 1017 which is manufactured and sold by Spencer Chemical Company, Kansas City, Missouri.

In utilizing patch or repair sheets according to the invention, particularly in repairing tears or rips, a portion sufficient to cover the torn area is trimmed from a larger sheet or tape of the mending material. The torn fabric is placed face down on an ironing pad or the like with the edges of the tear adjoining one another, and the mending sheet is placed thereon with the film side down. A heated iron (heated to, say, 275° F.–400° F. in the case of cotton) is then applied lightly to the back of the mending sheet and held there until the bond is achieved, usually no longer than 10 seconds. Upon removal of the iron the polyethylene will set and the job is completed.

In the case of repairs where a portion of the fabric is missing (for example, a hole burned in a garment) a piece of the garment material is trimmed to closely conform to the hole and is placed therein. Again, a suitably sized patch of the mending material is placed thereover and the steps outlined above are employed to finish the mend.

It will be understood that the construction herein disclosed is likewise useable wherever it is desired to join one fabric with another without sewing them together or utilizing other types of fasteners. Sheets can be provided in which the film is applied only as a marginal strip, perforations then being applied only in the film covered area. We, likewise, have found that while the perforations improve immeasurably the flexibility of the mending material and the bonding and drying qualities thereof, nevertheless, where flexibility and drying are not of particular consequence, the sheet may be employed without perforations.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. As a new article of manufacture, a mending sheet having a surface adapted for adhesion to fabrics under the influence of heat and pressure, such sheet composed of a flexible fabric web and a thin layer of polyethylene applied directly to one face of said web with portions of the layer adjacent said one face penetrated into the body of said web so as to firmly bond said layer to said web, said layer including a plurality of perforations extending therethrough in the direction of the thickness of the layer, said polyethylene having a density between 0.913 and 0.925 gram per cubic centimeter and a melt index between 4 and 25, the exposed face of said layer forming said surface.

2. A mending sheet as in claim 1 wherein said fabric web is of woven cotton.

3. A mending sheet as in claim 1 wherein said web and layer are provided with a plurality of registering perforations therethrough in the direction of the thickness of the sheet.

References Cited by the Examiner
UNITED STATES PATENTS

| | | | |
|---|---|---|---|
| 1,665,968 | 4/28 | Liedtke | 2—243 |
| 2,055,002 | 9/36 | Chandler | 117—10 |
| 2,602,932 | 7/52 | Eaton | 177—122 |
| 2,647,065 | 7/53 | School | 117—4 |
| 2,686,744 | 8/54 | Cornwell. | |
| 2,825,721 | 3/58 | Hogan et al. | 117—138.8 |
| 2,853,404 | 9/58 | Weinberg | 117—122 |
| 3,012,918 | 12/61 | Schaar. | |

OTHER REFERENCES

"Modern Plastics Encyclopedia," 1957, page 117.

WILLIAM D. MARTIN, *Primary Examiner.*

RICHARD D. NEVIUS, JOSEPH REBOLD,
*Examiners.*